Patented July 7, 1942

2,288,854

UNITED STATES PATENT OFFICE 2,288,854

CYCLIC KETALS OF 3-KETO-17-HYDROXY-17-ETHYNYL-CYCLOPENTANOPERHYDRO-PHENANTHRENES, AND METHOD OF PREPARING THEM

Homer E. Stavely, Highland Park, N. J., assignor to E. R. Squibb & Sons, New York, N. Y., a corporation of New York No Drawing. Application October 11, 1941, Serial No. 414,647

10 Claims. (Cl. 260—338)

This invention relates to, and has for its object the provision of, cyclic ketals of 3-keto-17-hydroxy-17-ethynyl-cyclopentanoperhydrophenanthrenes, and methods of preparing them.

For brevity and convenience, the term "cyclopentanoperhydrophenanthrene" is hereinafter replaced by the apt, telescopically-formed, term cythrene.

The compounds of this invention, especially the cyclic ketals of 3-keto-17-hydroxy-17-ethynyl compounds of the androstane series, are valuable as biologically-active agents and as precursors or intermediates for the preparation of biologically-active agents. Thus the ethylene ketal of 17-ethynyl-androstenone-3-ol-17, or 17-ethynyl-testosterone-(ethylene ketal) is an active oral progestational agent.

The compounds of this invention may be prepared by reacting a 3,17-diketo-cythrene-3-(cyclic ketal)—obtainable by reacting a 3,17-diketo-cythrene with an aliphatic polyhydric alcohol, as described in Fernholz application Serial No. 407,498, filed August 19, 1941—with acetylene in the presence of an alkali-metal tertiary alcoholate, as described in my Patent No. 2,239,864, dated April 29, 1941. Alternatively, the compounds of this invention may be prepared by reacting a 3-keto-17-hydroxy-17-ethynyl-cythrene —obtainable by reacting a 3-hydroxy-17-keto-cythrene with acetylene in the presence of an alkali-metal tertiary alcoholate as described in the aforesaid patent and oxidizing the resulting 3,17 - dihydroxy-17-ethynyl - cythrene—with an aliphatic polyhydric alcohol, as described in the aforesaid application.

The following examples are illustrative of the invention:

Example 1

(a) 1.0 g. 3,17-androstenedione ($\Delta^4$-androstenedione-3,17), 0.23 cc. ethylene glycol, and a crystal of p-toluene-sulfonic acid are dissolved in 50 cc. benzene, and the mixture is slowly distilled for 4 hours. 10 cc. of 2% alcoholic KOH is then added, followed by water, and the reaction mixture is extracted with ether. The ether is removed from the extract, and the residue dissolved in a small quantity of methanol; on standing for about 16 hours, 0.5 g. of a crystalline product is obtained, consisting of a mixture of mono- and di-(ethylene ketals) of 3,17-androstenedione.

The oily mother liquor from which the mixture of ketals crystallizes is reconverted into 3,17-androstenedione by refluxing for 1 hour in alcohol containing a few cc. of dilute hydrochloric acid, then adding water, extracting with ether, evaporating, and recrystallizing the residue. The unused 3,17-androstenedione is thus recovered almost quantitatively, and can be returned to the ketal-forming treatment.

(b) The mixture of ketals is dissolved in benzene, filtered through a 2 x 21 cm. column of alumina, and the column gradually washed through with benzene. The first 100 cc. of benzene contains 0.2 g. 3,17-androstenedione-di-(ethylene-ketal), which, on recrystallization from methanol, is obtained in the form of feathered needles melting at 173° C. The washing is then continued with benzene containing 10% alcohol, and on removal of the solvent from this wash, 0.3 g. of 3,17-androstenedione-3-(ethylene ketal) is obtained. It crystallizes from methanol in the form of thick prisms melting at 194° C.; this, however, is an unstable modification, which, on solidifying from the melted form, is transformed into the more stable modification melting at 202° C. The thus-obtained mono-(cyclic ketal) has the ketal group on $C_3$, as clearly indicated by the facts that it does not have the characteristic absorption spectrum of an $\alpha$-$\beta$-unsaturated ketone and that it is transformed into testosterone-(ethylene ketal) on hydrogenation.

(c) 1 g. $\Delta^4$-3,17-androstenedione-3-(ethylene ketal) is dissolved in 100 cc. dry ether and placed in a round-bottom flask fitted with a stirrer and mercury seal. Purified, dried acetylene is bubbled through the stirred solution for about 30 minutes at room temperature; then, while continuing the acetylene addition and stirring, a solution of potassium tertiary amylate (prepared from 1 g. potassium and 15 cc. dry tertiary-amyl alcohol) is added dropwise, and thereafter the acetylene addition and stirring are continued for about 5 hours. The reaction mixture is then poured into 200 cc. slightly alkaline water, and thoroughly extracted with ether; and the ether solution is washed with water, dried, and evaporated to dryness in vacuo. The residue, 17-ethynyl-testosterone-(ethylene ketal), is recrystallized from benzene several times, the melting point reaching a constant value of 252-254° C. (uncorrected); $[\alpha]^{25}_D$ —97±3°.

Example 2

800 mg. 17-ethynyl-androstenediol-3,17 (cf. the aforesaid patent) is oxidized with 1 g. aluminum isopropylate in 25 cc. dry cyclohexanone and 50 cc. dry toluene. The mixture is refluxed for 1½ hours, cooled, poured into 300 cc. 2NHCl and extracted with ether; and on evaporating the ether, steam-distilling the residue to remove cyclohexanone, and filtering off the resulting precipitate and recrystallizing it from ethyl acetate, 450 mg. of 17-ethynyl-testosterone (melting at 265° C.) is obtained.

800 mg. 17-ethynyl-testosterone and 3.0 cc. ethylene glycol are dissolved in 50 cc. dry benzene, a few crystals of p-toluenesulfonic acid are added, and the mixture is heated to boiling and the benzene slowly distilled off for 4-5 hours. 10 cc. 2% KOH in alcohol is then added, followed by 100 cc. water, and the mixture is extracted with ether; the ether solution is washed, dried, evaporated to dryness, and the residue crystallized from benzene. On repeated crystallization, the melting point is raised to a constant value of 252-254° C. (uncorrected). The product obtained, 17-ethynyl-testosterone-(ethylene ketal), is identical with that obtained in Example 1.

The ethylene glycol used in the foregoing example may be replaced by 1,2-propylene glycol, trimethylene glycol, glycerol, various carbohydrates, and other aliphatic polyhydric alcohols; and 3,17-androstenedione-3(cyclic ketals) derived from such other aliphatic polyhydric alcohols may be used in place of the 3,17-androstenedione-3-(ethylene ketal) in Example 1.

The invention is manifestly applicable to the production of cyclic ketals of 3-keto-17-hydroxy-17-ethynyl-cythrenes other than of 3-keto-17-hydroxy-17-ethynyl androstene (ethynyl-testosterone). Thus, the procedure of Example 1 is manifestly applicable to the treatment of 3-(cyclic ketals) of other 3,17-diketo-cythrenes, inter alia:

3,17-androstanedione
    $\Delta^4$-androstenetrione-3,11,17
    $\Delta^{4,6}$-androstadienone-3,17
    $\Delta^1$-androstenedione-3,17
    $\Delta^5$-androstenedione-3,17
    $\Delta^4$-androstenetrione-3,6,17
    5,6-oxo-androstanedione-3,17

Cyclic ketals of 3-keto-17-hydroxy-17-ethynyl-cythrenes other than of ethynyl-testosterone are manifestly also obtainable by the procedure of Example 2, using other 3-oxy-17-hydroxy-17-ethynyl-cythrenes in place of that used in that example, the ethynyl compounds being obtained (cf. the aforesaid patent), by reacting acetylene with 3-oxy-17-keto-cythrenes, inter alia:

Androsterone
    Androstanediol-3,11-one-17
    $\Delta^5$-androstanediol-3,11-one-17
    $\Delta^5$-androstenediol-3,11-one-17

When forming cyclic acetals from 17-ethynyl-testosterone and other $\Delta^4$-3-keto-cythrenes, it is believed that there is a shift of the double bond to the 5-6 position on formation of the cyclic ketal; but it is not intended that the invention be limited by any theoretical explanations.

The invention may be variously otherwise embodied, within the scope of the appended claims.

I claim:

1. A cyclic ketal of a 3-keto-17-hydroxy-17-ethynyl-cythrene.

2. An ethylene ketal of a 3-keto-17-hydroxy-17-ethynyl-cythrene.

3. A cyclic ketal of a 3-keto-17-hydroxy-17-ethynyl compound of the androstane series.

4. A cyclic ketal of 17-ethynyl-testosterone.

5. 17-ethynyl-testosterone-(ethylene ketal).

6. The method of preparing a cyclic ketal of a 3-keto-17-hydroxy-17-ethynyl-cythrene, which comprises reacting a 3,17-diketo-cythrene-3-(cyclic ketal) with acetylene in the presence of an alkali-metal tertiary alcoholate.

7. The method of preparing a cyclic ketal of a 3-keto-17-hydroxy-17-ethynyl-cythrene, which comprises reacting a 3-keto-17-hydroxy-17-ethynyl-cythrene with an aliphatic polyhydric alcohol.

8. The method of preparing a cyclic ketal of 17-ethynyl testosterone, which comprises reacting a 3,17-androstenedione-3-(cyclic ketal) with acetylene in the presence of an alkali-metal tertiary butylate.

9. The method of preparing a cyclic ketal of 17-ethynyl testosterone, which comprises reacting 17-ethynyl-testosterone with an aliphatic polyhydric alcohol.

10. The method of preparing a cyclic ketal of a 3-keto-17-hydroxy-17-ethynyl-cythrene, which comprises reacting a 3-keto-17-hydroxy-17-ethynyl-cythrene with an aliphatic polyhydric alcohol in the presence of p-toluenesulfonic acid.

HOMER E. STAVELY.